(12) United States Patent
Sugiura et al.

(10) Patent No.: US 7,692,755 B2
(45) Date of Patent: Apr. 6, 2010

(54) LIQUID CRYSTAL DISPLAY DEVICE INCLUDING PROTRUSION WITH RECESSED PORTION FOR ACCEPTING SPHERICAL SPACER

(75) Inventors: Norio Sugiura, Kawasaki (JP); Yoji Taniguchi, Kawasaki (JP); Minoru Otani, Kawasaki (JP); Kengo Kanii, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 11/055,447

(22) Filed: Feb. 10, 2005

(65) Prior Publication Data
US 2006/0044499 A1 Mar. 2, 2006

(30) Foreign Application Priority Data
Aug. 26, 2004 (JP) ............................... 2004-246146

(51) Int. Cl.
G02F 1/1337 (2006.01)
G02F 1/1339 (2006.01)

(52) U.S. Cl. ..................... 349/155; 349/123; 349/129; 349/130

(58) Field of Classification Search ......... 349/123–130, 349/155–157
See application file for complete search history.

(56) References Cited

U.S. PATENT DOCUMENTS

| | | | | | |
|---|---|---|---|---|---|
| 5,486,941 | A | * | 1/1996 | Saiuchi et al. | 349/155 |
| 5,764,327 | A | * | 6/1998 | Hanyu et al. | 349/133 |
| 5,986,724 | A | * | 11/1999 | Akiyama et al. | 349/41 |
| 6,139,927 | A | * | 10/2000 | Takao et al. | 428/1.26 |
| 6,486,936 | B1 | * | 11/2002 | Sugimoto | 349/155 |
| 6,515,725 | B1 | * | 2/2003 | Hattori et al. | 349/123 |
| 6,661,488 | B1 | * | 12/2003 | Takeda et al. | 349/117 |
| 6,738,125 | B2 | | 5/2004 | Yamada et al. | |
| 6,924,871 | B2 | * | 8/2005 | Washizawa et al. | 349/156 |
| 6,977,704 | B2 | | 12/2005 | Kataoka | |
| 2001/0005257 | A1 | | 6/2001 | Yamada et al. | |
| 2002/0159018 | A1 | * | 10/2002 | Kataoka et al. | 349/143 |
| 2003/0048401 | A1 | * | 3/2003 | Hanaoka et al. | 349/123 |
| 2003/0058374 | A1 | | 3/2003 | Takeda et al. | |

(Continued)

FOREIGN PATENT DOCUMENTS

EP 0884626 A2 12/1998

(Continued)

*Primary Examiner*—David Nelms
*Assistant Examiner*—Lauren Nguyen
(74) *Attorney, Agent, or Firm*—Greer, Burns & Crain, Ltd.

(57) ABSTRACT

A liquid crystal display device including two substrates, with a pixel electrode formed on one substrate and an opposite electrode formed on the other substrate. The device also includes an alignment film formed on the opposite electrode, a protrusion formed between the opposite electrode and the alignment film, spherical spacers, liquid crystal, and an alignment film protrusion formed by the alignment film in an area corresponding to the protrusion, such that the protrusion causes the alignment film protrusion to protrude toward the liquid crystal. The alignment film protrusion is recessed on a side opposite one of the substrates and regulates an alignment direction of the liquid crystal contacting it. Further, the alignment film protrusion includes a recessed portion, within an outer surface thereof, within which at least one spherical spacer is seated, whereby the recessed portion reduces compressive stress exerted on the substrates by the spherical spacer seated therein.

6 Claims, 5 Drawing Sheets

U.S. PATENT DOCUMENTS

| | | | |
|---|---|---|---|
| 2003/0071952 | A1 | 4/2003 | Yoshida et al. |
| 2003/0231272 | A1* | 12/2003 | Nakamura et al. .......... 349/123 |
| 2004/0046915 | A1* | 3/2004 | Takeda et al. ............... 349/129 |
| 2004/0119924 | A1 | 6/2004 | Takeda et al. |
| 2005/0041180 | A1* | 2/2005 | Ozawa ........................ 349/98 |

FOREIGN PATENT DOCUMENTS

| | | | |
|---|---|---|---|
| JP | 8-122753 | | 5/1996 |
| JP | 08-122753 | * | 5/1996 |
| JP | 09-179101 | | 7/1997 |
| JP | 11-258606 | | 9/1999 |
| JP | 2001-183637 | | 7/2001 |
| JP | 2003-043494 | | 2/2003 |
| JP | 2003-156731 | | 5/2003 |
| JP | 2003-186017 | | 7/2003 |
| KR | 1996-0015028 | | 5/1996 |
| KR | 1999-006951 | | 1/1999 |

* cited by examiner

| SAMPLE | 10%K VALUE | LIGHT LEAK IN THE VICINITY OF PROTRUSION | |
|---|---|---|---|
| | | BEFORE TAP TEST | AFTER TAP TEST |
| 1 | 3.92mPa | SLIGHT LIGHT LEAK OCCURS | REMARKABLE LIGHT LEAK |
| 2 | | REMARKABLE LIGHT LEAK | REMARKABLE LIGHT LEAK |
| 3 | 4.70mPa | NO LIGHT LEAK OCCURS | SLIGHT LIGHT LEAK OCCURS |
| 4 | | NO LIGHT LEAK OCCURS | NO LIGHT LEAK OCCURS |
| 5 | 5.98mPa | NO LIGHT LEAK OCCURS | NO LIGHT LEAK OCCURS |
| 6 | | NO LIGHT LEAK OCCURS | NO LIGHT LEAK OCCURS |

LIQUID CRYSTAL DISPLAY DEVICE INCLUDING PROTRUSION WITH RECESSED PORTION FOR ACCEPTING SPHERICAL SPACER

BACKGROUND OF THE INVENTION

1. Field of the Invention

The present invention relates to a liquid crystal display device used for a display part of an electronic equipment, and particularly to a liquid crystal display device including a vertical alignment type liquid crystal having a negative dielectric anisotropy.

2. Description of the Related Art

A vertical alignment (VA) mode liquid crystal display device has features of a high contrast ratio and a high speed response characteristic, and in recent years, the VA mode liquid crystal display device has been actively developed. Especially, an MVA (Multi-domain Vertical Alignment) mode liquid crystal display device has features of a wide viewing angle, a high contrast ratio and a high speed response characteristic, and receives attention as a display system most suitable for a flat panel display for a TV receiver. FIG. 7 shows a sectional structure of one pixel of the MVA mode liquid crystal display device. As shown in FIG. 7, the MVA mode liquid crystal display device includes a glass substrate 103 of a TFT substrate 102, an opposite side glass substrate 105 of an opposite substrate 104 disposed to be opposite to the TFT substrate 102, and a liquid crystal 112 sealed between both the substrates 102 and 104.

An insulating layer 106 is formed on the glass substrate 103. Plural gate bus lines and plural drain bus lines (neither of them are shown) intersecting each other through the insulating layer 106 are formed on the glass substrate 103. A not-shown thin film transistor (TFT) is formed at each of intersection parts of the gate bus lines and the drain bus lines. The gate bus lines and the drain bus lines are insulated from each other through the insulating layer 106. Besides, the insulating film 106 functions as a gate insulating film of the TFT. A pixel electrode 110 made of indium tin oxide (ITO) and patterned into a specified shape is formed on a final protection film 108. The pixel electrode 110 is connected to a source electrode of the TFT through a not-shown contact hole formed in the final protection film 108. A pixel electrode slit 116 as an alignment regulating structure for regulating an alignment direction of a liquid crystal molecule 120 is formed in the pixel electrode 110. A vertical alignment film 114 for vertically aligning the liquid crystal molecule 120 is formed on the whole surface of the pixel electrode 110 and the pixel electrode slit 116.

On the other hand, a not-shown color filter (CF) layer is formed on the opposite side glass substrate 105. An opposite electrode 124 made of ITO is formed on the CF layer and the whole surface of the substrate. A linear protrusion 118 as an alignment regulating structure protruding on the opposite electrode 124 is formed on the opposite side glass substrate 105. Similarly to the pixel electrode slit 116, the linear protrusion 118 is formed in order to regulate the alignment direction of the liquid crystal molecule 120. A vertical alignment film 122 is formed on the whole surface of the opposite electrode 124 and covers the linear protrusion 118. In the MVA mode liquid crystal display device, the linear protrusion 118 and the pixel electrode slit 116 are provided in the pixel, so that the alignment control of the liquid crystal 112 and multi-domain formation are realized.

[Patent document 1] JP-A-2001-183637
[Patent document 2] JP-A-8-122753

As a method of keeping the thickness (cell gap) of the layer of the liquid crystal 112 at a desired length, there is used a method of scattering spherical ball spacers 136 each having a diameter equal to the desired cell gap into the layer of the liquid crystal 112. The ball spacers 136 are made of plastic material or glass material. The ball spacers 136 are scattered on the TFT substrate 102 or the opposite substrate 104, and the TFT substrate 102 and the opposite substrate 104 are attached to each other through a seal material formed into a frame shape, so that the liquid crystal 112 is sealed between both the substrates 102 and 104.

For example, when the ball spacers 136 are scattered on the opposite substrate 104, there is a case where the ball spacer 136 is disposed on the linear protrusion 118. The cell gap at the position where the linear protrusion 118 is formed is narrow as compared with the other position. Thus, as shown in FIG. 7, the cell gap at the linear protrusion 118 is narrower than the diameter of the ball spacer 136. Since the ball spacer 136 is made of relatively hard material as compared with the vertical alignment films 114 and 122, when the opposite substrate 104 and the TFT substrate 102 are attached to each other, there is a case where the vertical alignment films 114 and 122 on the linear protrusion 118 and on the opposite side thereof are damaged by the pressure of the ball spacer 136.

At this state, the alignment control of the liquid crystal molecule 120 at the position becomes impossible, light leak occurs at the linear protrusion 118 and in the vicinity thereof, and a poor display occurs in the MVA mode liquid crystal display device. In general, in order to realize excellent alignment of the liquid crystal molecule 120, it is necessary that the width of the linear protrusion 118 is about 10 μm. This corresponds to several percents of the area of the pixel region. For example, in a 15-inch MVA mode liquid crystal display device with a resolution of XGA (extended Graphics Array), in the case where the linear protrusion 118 is formed to have a width of 15 μm, and 100 ball spacers per 1 $mm^2$ are scattered, there is a case where about 7 ball spacers per 1 $mm^2$ are scattered on the linear protrusion 118. When the vertical alignment films 114 and 122 are damaged by the ball spacer 136, the light leak occurring on the display screen becomes very noticeable.

SUMMARY OF THE INVENTION

The present invention has an object to provide a liquid crystal display device in which light leak due to damage of an alignment film is prevented and an excellent display characteristic can be obtained.

The above object can be achieved by a liquid crystal display device including a pair of substrates disposed to be opposite to each other, spherical spacers scattered between the pair of substrates, a liquid crystal sealed between the pair of substrates, a protrusion as an alignment regulating structure protruding from one of the pair of substrates and for regulating an alignment direction of the liquid crystal, and a recessed part formed in the other of the pair of substrates to be opposite to the protrusion.

According to the invention, the liquid crystal display device which prevents the light leak due to the damage of the alignment film and has the excellent display characteristic can be realized.

DESCRIPTION OF THE PREFERRED EMBODIMENT

First Embodiment

Figure 1:
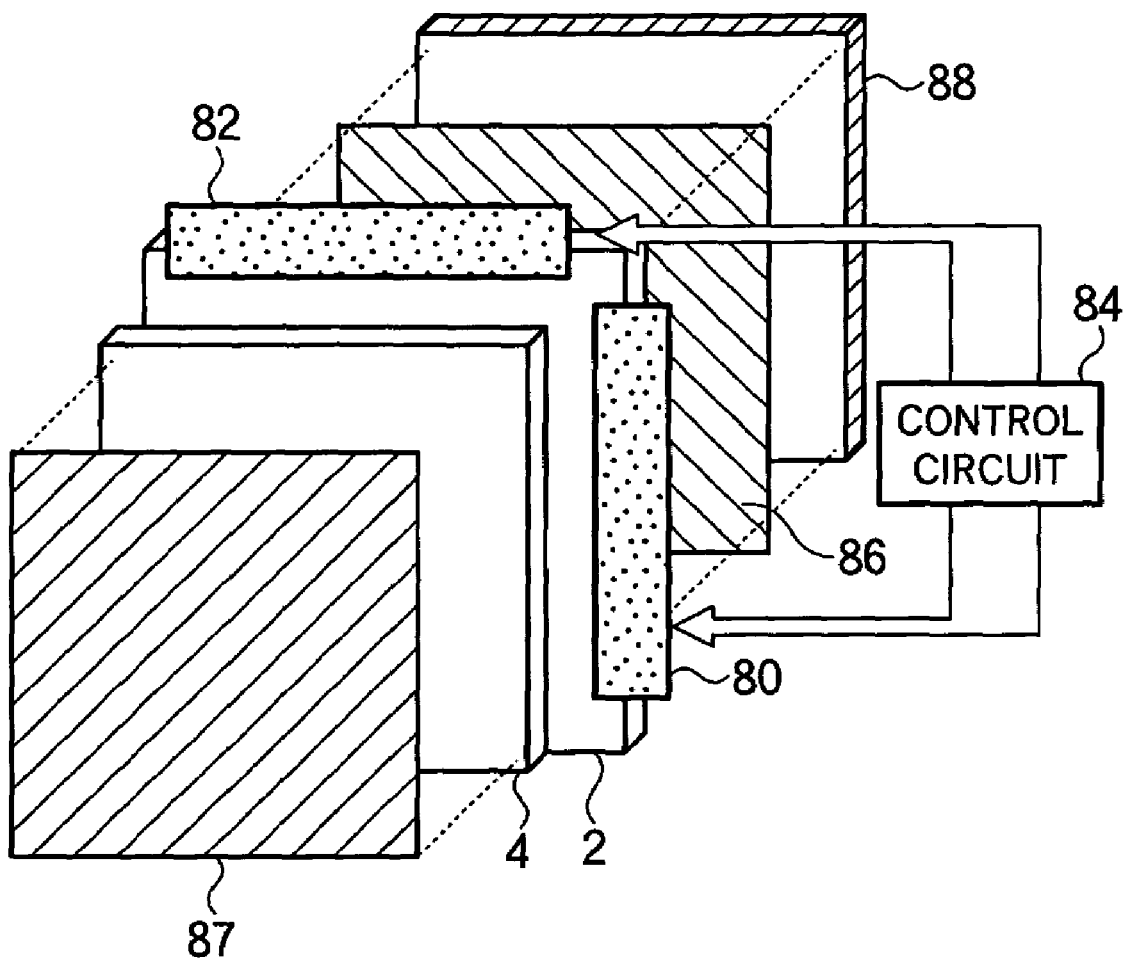
FIG. 1 is a view showing a rough structure of a liquid crystal display device according to a first embodiment of the invention.
Figure 2A:
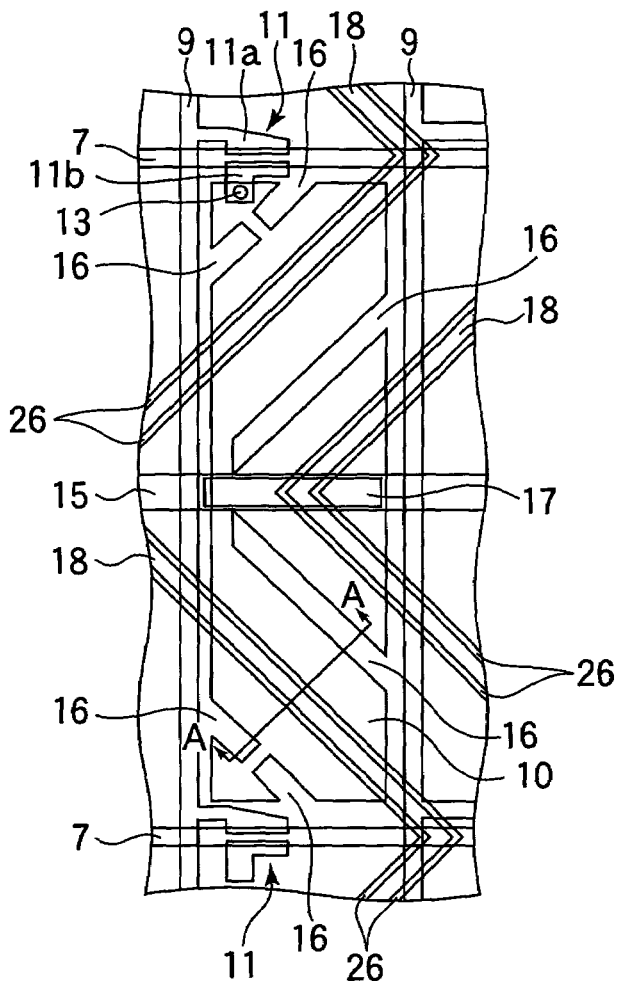
FIGS. 2A and 2B are views showing a structure of one pixel of the liquid crystal display device according to the first embodiment of the invention.
Figure 2B:
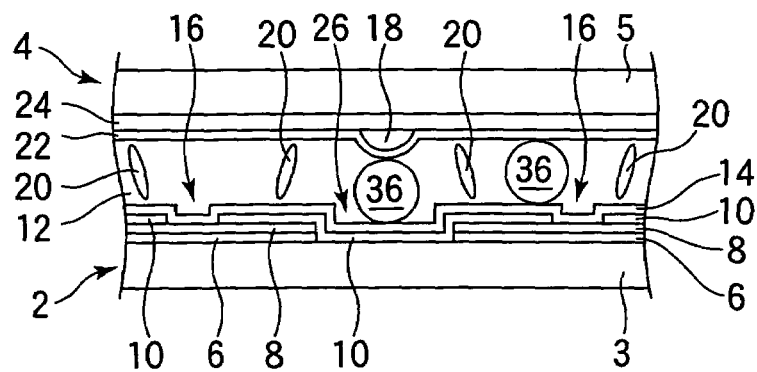

A liquid crystal display device according to a first embodiment of the invention will be described with reference to FIGS. 1 to 2B. FIG. 1 shows a rough structure of the liquid crystal display device according to this embodiment. FIGS. 2A and 2B show a rough structure of one pixel of the MVA mode liquid crystal display device according to this embodiment. FIG. 2A shows the structure of the one pixel when a display screen of the liquid crystal display device is viewed in the direction of a normal line, and FIG. 2B shows a sectional structure taken along line A-A of FIG. 2A.

As shown in FIGS. 1 to 2B, the MVA mode liquid crystal display device includes a liquid crystal display panel having such a structure that a TFT substrate 2 on which a pixel electrode 10, a TFT 11 and the like are formed for each pixel region is made to be opposite to and to be attached to an opposite substrate 4 on which a CF layer (not shown) and the like are formed, and a liquid crystal 12 having a negative dielectric anisotropy is sealed between them. Vertical alignment films 14 and 22 for aligning liquid crystal molecules 20 in, for example, the direction vertical to the substrate surface are formed on the opposing surfaces of both the substrates 2 and 4.

As shown in FIG. 1, the TFT substrate 2 is provided with a gate bus line drive circuit 80 on which a driver IC for driving plural gate bus lines 7 (see FIG. 2A) is mounted, and a drain bus line drive circuit 82 on which a driver IC for driving plural drain bus lines 9 (see FIG. 2A) is mounted. Both the drive circuits 80 and 82 output a scanning signal and a data signal to a specified gate bus line or drain bus line on the basis of a specified signal outputted from a control circuit 84.

A polarizing plate 86 is attached to a surface of the TFT substrate 2 at the opposite side to the element formation surface thereof. A backlight unit 88 constructed of, for example, a linear primary light source and a planar optical waveguide plate is disposed at the far side of the polarizing plate 86 with respect to the TFT substrate 2. On the other hand, a polarizing plate 87 is attached to a surface of the opposite substrate 4 at the opposite side to the resin CF layer formation surface thereof.

As shown in FIG. 2B, the MVA mode liquid crystal display device includes a glass substrate 3 used for the TFT substrate 2, an opposite side glass substrate 5 used for the opposite substrate 4 disposed to be opposite to the TFT substrate 2, and the liquid crystal 12 sealed between both the substrates 2 and 4. In order to keep a cell gap at a specified length, plural spherical ball spacers (spherical spacers) 36 are scattered in the liquid crystal 12. Each of the ball spacers has a diameter almost equal to a desired cell gap.

As shown in FIGS. 2A and 2B, a CF layer (not shown) is formed on the opposite side glass substrate 5. An opposite electrode 24 made of ITO is formed on the CF layer and the whole surface of the substrate. A linear protrusion 18 as an alignment regulating structure protruding on the opposite electrode 24 is formed on the opposite side glass substrate 5. The linear protrusion 18 is formed in order to regulate the alignment direction of the liquid crystal molecule 20. The length (height) of the linear protrusion 18 from the opposite electrode 24 to its top is formed to be, for example, 1.5 μm. The vertical alignment film 22 for vertically aligning the liquid crystal molecule 20 is formed on the whole surface of the opposite electrode 24 and covers the linear protrusion 18.

On the other hand, the TFT substrate 2 includes the plural gate bus lines 7 extending in the horizontal direction of FIG. 2A on the glass substrate 3. An insulating layer 6 is formed on the gate bus lines 7. The plural drain bus lines 9 extending in the vertical direction of FIG. 2A are formed to intersect the gate bus lines 7 through the insulating layer 6. The TFT 11 is formed at each of intersection parts of the gate bus lines 7 and the drain bus lines 9. The insulating layer 6 between the gate bus line 7 and a drain electrode 11a or a source electrode 11b functions as a gate insulating film of the TFT 11. A final protection film 8 is formed on the insulating layer 6 and covers the drain bus lines 9.

The pixel electrode 10 patterned into a specified shape and made of ITO is formed in each of pixel regions surrounded by the gate bus lines 7 and the drain bus lines 9 on the final protection film 8. The pixel electrode 10 is connected to the source electrode 11b of the TFT 11 through a contact hole 13 formed in the final protection film 8. A storage capacitor bus line 15 extending in parallel to the gate bus line 7 is formed to cross almost the center of the pixel region. A storage capacitor electrode (intermediate electrode) 17 is formed on the storage capacitor bus line 15 through the insulating film 6 for each of the pixel regions.

A pixel electrode slit 16 with an electrode cutout structure is formed as an alignment regulating structure in the pixel electrode 10. Similarly to the linear protrusion 18, the pixel electrode slit 16 is formed in order to regulate the alignment direction of the liquid crystal molecule 20. The vertical alignment film 14 for vertically aligning the liquid crystal molecule 20 is formed on the whole surface of the pixel electrode 10 and the pixel electrode slit 16.

The TFT substrate 2 includes a recessed part 26 formed at a position opposite to the linear protrusion 18. The recessed part 26 is formed by removing the insulating layer 6 and the final protection film 8. The recessed part 26 is formed along the linear protrusion 18. The depth of the recessed part 26 is formed to be, for example, 1 μm.

As shown in FIG. 2B, the recessed part 26 is provided at the position of the TFT substrate 2 opposite to the linear protrusion 18, so that the cell gap at the position where the linear protrusion 18 is formed becomes large as compared with a cell gap at the same position in the case where the recessed part 26 is not provided as in the related art. The cell gap at the position where the linear protrusion 18 is formed becomes almost equal to that at the other position. Thus, when the ball spacers 36 are scattered on the opposite substrate 4, even if the ball spacer 36 is disposed on the linear protrusion 18, it is possible to relieve compressive stress exerted on the vertical alignment films 14 and 22 from the ball spacer 36 on the linear protrusion 18 when the opposite substrate 4 and the TFT substrate 2 are attached to each other. By this, the vertical alignment films 14 and 22 on the linear protrusion 18 and on the opposite side thereof are not damaged. Accordingly, since the light leak due to poor alignment of the liquid crystal molecule 20 does not occur at the linear protrusion 18 and in the vicinity thereof, the contrast ratio can be improved.

As described above, according to this embodiment, the MVA mode liquid crystal display device includes the recessed part 26 at the position of the TFT substrate 2 opposite to the linear protrusion 18. By this, it is possible to relieve the compressive stress exerted on the vertical alignment films 14 and 22 from the ball spacer 36 on the linear protrusion 18 when both the substrates 2 and 4 are attached to each other. Thus, the vertical alignment films 14 and 22 on the linear protrusion 18 and on the opposite side thereof can be prevented from being damaged, and the light leak at the linear protrusion 18 and in the vicinity thereof does not occur. By this, the contrast ratio is improved, and the MVA mode liquid crystal display device having the excellent display characteristic can be realized.

Second Embodiment

Figure 3:
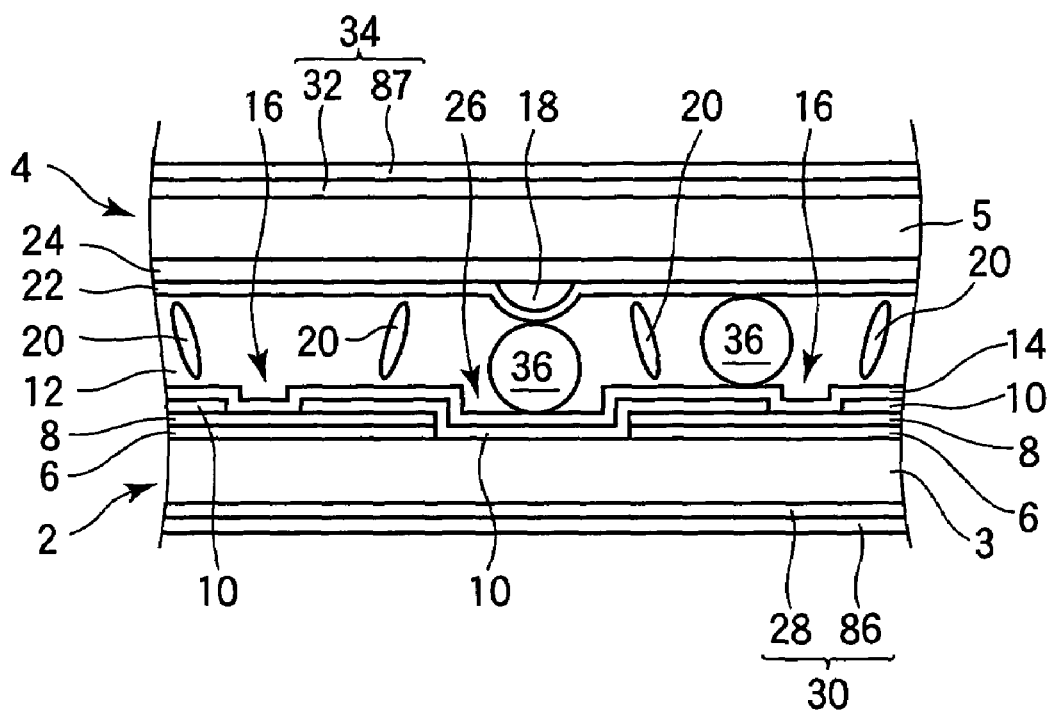
FIG. 3 is a view showing a sectional structure of one pixel of a liquid crystal display device according to a second embodiment of the invention.

A liquid crystal display device according to a second embodiment of the invention will be described with reference to FIG. 3. FIG. 3 shows a sectional structure of one pixel of the MVA mode liquid crystal display device according to this embodiment. As shown in FIG. 3, the MVA mode liquid crystal display device according to this embodiment is characterized in that circular polarizing plates 30 and 34 are disposed on the opposite sides of opposing surfaces of a TFT substrate 2 and an opposite substrate 4 having the same pixel structure as the former embodiment.

As shown in FIG. 3, the circular polarizing plate 30 is disposed on the side of the TFT substrate 2, and the circular polarizing plate 34 is disposed on the side of the opposite substrate 4. The circular polarizing plates 30 and 34 are disposed in crossed Nicols at both sides of a liquid crystal 12. The circular polarizing plate 30 includes a ¼ wavelength plate 28 and a polarizing plate 86 disposed in sequence from the side of the TFT substrate 2. The ¼ wavelength plate 28 and the polarizing plate 86 are disposed so that an angle between an optical axis (delay phase axis) of the ¼ wavelength plate 28 and an absorption axis of the polarizing plate 86 becomes about 45°. The circular polarizing plate 34 includes a ¼ wavelength plate 32 and a polarizing plate 87 disposed in sequence from the side of the opposite substrate 4. The ¼ wavelength plate 32 and the polarizing plate 87 are disposed so that an angle between an optical axis of the ¼ wavelength plate 32 and an absorption axis of the polarizing plate 87 becomes about 45°. The optical axes of both the ¼ wavelength plates 28 and 32 are almost perpendicular to each other.

In the case where the circular polarizing plates 30 and 34 are used for the MVA mode liquid crystal display device, since the transmissivity of light does not depend on the tilt direction of a liquid crystal molecule 20, as compared with the case where only the polarizing plates 86 and 87 are used, the transmissivity is improved. On the other hand, the light leak occurring due to poor alignment of the liquid crystal molecule 20 caused by few scratches of the vertical alignment films 14 and 22 becomes noticeable. However, in this embodiment, a recessed part 26 is provided at a position opposite to a linear protrusion 18, so that the vertical alignment films 14 and 22 are not damaged. Thus, the circular polarizing plates 30 and 34 can be used without fear of the light leak due to the damage of the vertical alignment films 14 and 22, and the transmissivity of the MVA mode liquid crystal display device can be improved.

As stated above, in the MVA mode liquid crystal display device according to this embodiment, since the transmissivity is improved, the display characteristic can be improved. Besides, in the case where the brightness of the display screen of the liquid crystal display device of this embodiment and that of the liquid crystal display device of the former embodiment are made identical to each other, since the transmissivity of the liquid crystal display device of this embodiment is high, the surface brightness of a backlight unit can be lowered. Thus, consumed electric power of the backlight unit can be reduced. Accordingly, in the liquid crystal display device of this embodiment, the consumption electric power can be reduced more than the liquid crystal display device of the former embodiment.

The circular polarizing plates 30 and 34 can also be applied to MVA mode liquid crystal display devices of third to fifth embodiments described later.

Third Embodiment

Figure 4:
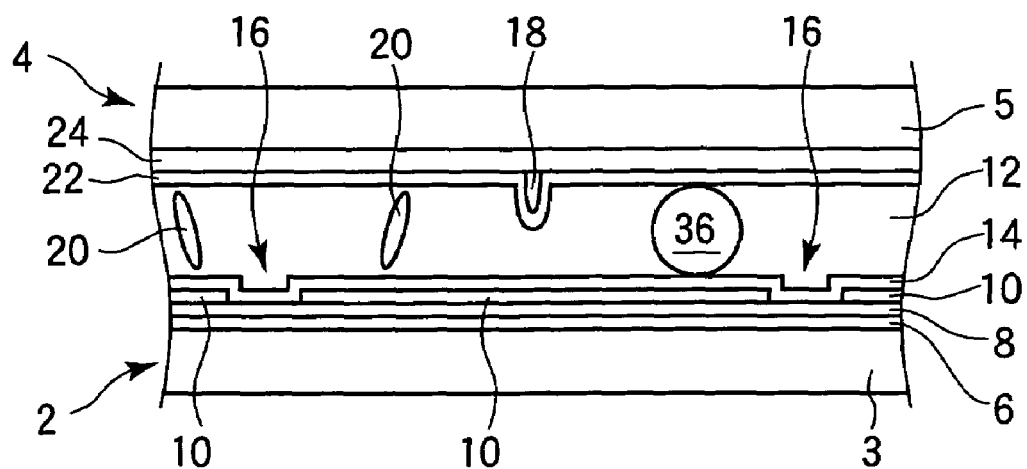
FIG. 4 is a view showing a sectional structure of one pixel of a liquid crystal display device according to a third embodiment of the invention.

A liquid crystal display device according to a third embodiment of the invention will be described with reference to FIG. 4. FIG. 4 shows a sectional structure of one pixel of the MVA mode liquid crystal display device according to this embodiment. As shown in FIG. 4, the MVA mode liquid crystal display device according to this embodiment is characterized in that the width of a linear protrusion 18 is formed to be shorter than the diameter of a ball spacer 36.

When the width of the linear protrusion 18 in the direction (horizontal direction in the drawing) parallel to a resin CF layer formation surface of an opposite substrate 4 is made smaller than the diameter of the ball spacer 36, in the case where the ball spacer 36 is scattered on the linear protrusion 18, the ball spacer 36 comes in contact with the linear protrusion 18 at a point or a line. Thus, as shown in FIG. 4, when a TFT substrate 2 and the opposite substrate 4 are attached to each other, the ball spacer 36 easily rolls down from the linear protrusion 18, and moves from the first scattered position. By this, since the ball spacer 36 is not sandwiched between the linear protrusion 18 and the TFT substrate 2, vertical alignment films 14 and 22 on the linear protrusion 18 and on the opposite side thereof can be prevented from being damaged. Besides, when the width of the linear protrusion 18 is made short, the ratio of the area of the linear protrusion 18 occupying a pixel region becomes small. Accordingly, a probability that the ball spacer 36 is scattered on the linear protrusion 18 is decreased, and the vertical alignment films 14 and 22 can be prevented from being damaged.

As described above, according to this embodiment, in the MVA mode liquid crystal display device, the width of the linear protrusion 18 is made shorter than the diameter of the ball spacer 36, so that the vertical alignment films 14 and 22 on the linear protrusion 18 and on the opposite side thereof are not damaged. Accordingly, the light leak at the linear protrusion 18 and in the vicinity thereof does not occur. By this, the contrast ratio is improved, and the MVA mode liquid crystal display device having the excellent display characteristic can be realized.

Fourth Embodiment

Figures 5, 6:
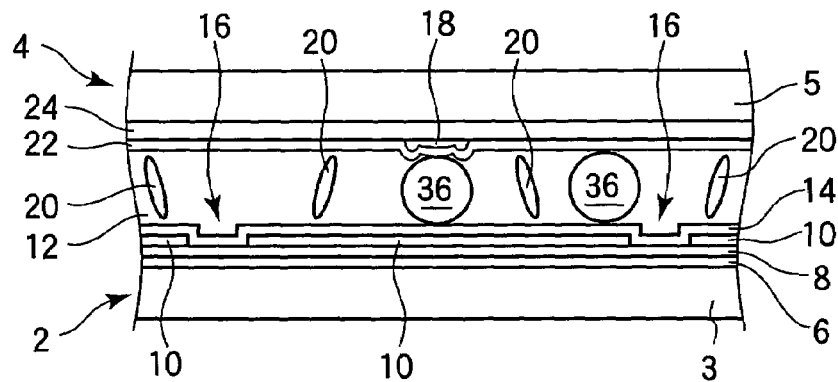
FIG. 5 is a view showing a sectional structure of one pixel of a liquid crystal display device according to a fourth embodiment of the invention.
FIG. 6 is a view showing results of a tap test of a liquid crystal display device according to a fifth embodiment of the invention.

A liquid crystal display device according to a fourth embodiment of the invention will be described with reference to FIG. 5. FIG. 5 shows a sectional structure of one pixel of the MVA mode liquid crystal display device according to this embodiment. As shown in FIG. 5, the MVA mode liquid crystal display device according to this embodiment is characterized by including a linear protrusion 18 formed to be recessed on the side opposite to a TFT substrate 2.

The linear protrusion 18 on the opposite side to the TFT substrate 2 is formed to be recessed, so that a cell gap at a position where the linear protrusion 18 is disposed becomes large as compared with a cell gap at the same position in the case where the top of the linear protrusion 18 is not formed to be recessed as in the related art. Thus, similarly to the first embodiment, even if a ball spacer 36 is scattered on the linear protrusion 18, it is possible to reduce compressive stress exerted on vertical alignment films 14 and 22 from the ball spacer 36 on the linear protrusion 18 when an opposite substrate 4 and the TFT substrate 2 are attached to each other. By this, the vertical alignment films 14 and 22 on the linear protrusion 18 and on the opposite side thereof are not damaged.

As described above, according to this embodiment, in the MVA mode liquid crystal display device, the linear protrusion 18 on the opposite side to the TFT substrate 2 is formed to be recessed, so that it is possible to release the compressive stress exerted on the vertical alignment films 14 and 22 from the ball spacer 36 when both the substrates 2 and 4 are attached to each other. Thus, the vertical alignment films 14 and 22 on the linear protrusion 18 and on the opposite side thereof can be prevented from being damaged, and the light leak at the linear protrusion 18 and in the vicinity thereof does not occur. By this, the contrast ratio is improved and the MVA mode liquid crystal display device having the excellent display characteristic can be realized.

Fifth Embodiment

A liquid crystal display device according to a fifth embodiment of the invention will be described with reference to FIG. 6. The MVA mode liquid crystal display device according to this embodiment is characterized by including ball spacers made of relatively soft material as compared with vertical alignment films 14 and 22.

Figure 7:
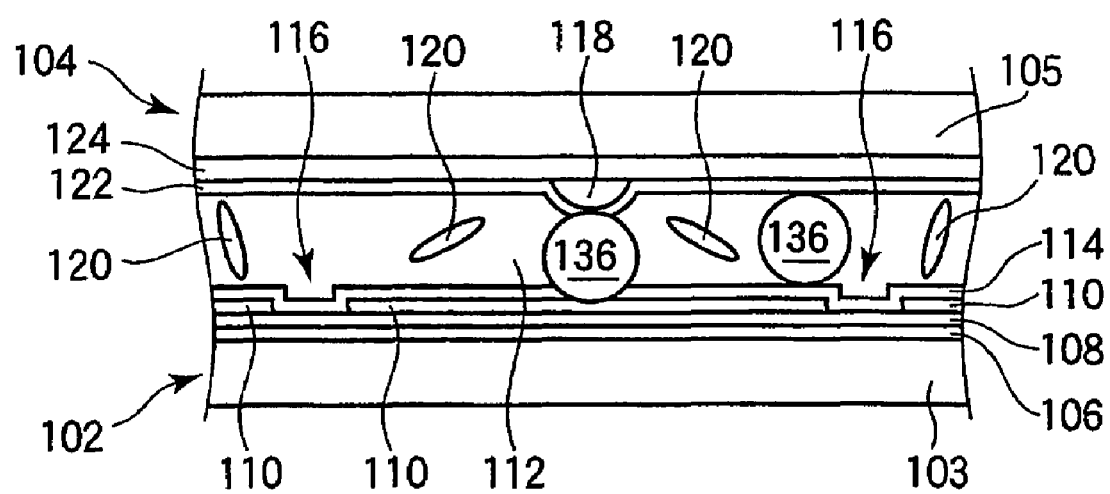
FIG. 7 is a view showing a sectional structure of one pixel of a conventional liquid crystal display device.

FIG. 6 shows experimental results on light leak at a linear protrusion and in the vicinity thereof when three kinds of ball spacers different in hardness are used. A sectional structure of one pixel of the MVA mode liquid crystal display device used for the experiment is the same as the conventional MVA mode liquid crystal display device shown in FIG. 7, and is fabricated in a manner described below. First, a TFT substrate on which a vertical alignment film RN1663 made by Nissan Chemical Industries, Ltd. is formed to have a thickness of 100 nm is formed. Next, three kinds of ball spacers different in hardness and having a diameter of 4.5 μm are dry scattered uniformly on the TFT substrate surface at a density of 130±30 spacers/mm$^2$. The 10% K values of the three kinds of ball spacers are 3.92 mPa, 4.70 mPa and 5.98 mPa. Next, the TFT substrate on which the ball spacers are scattered is bonded to an opposite substrate on which a vertical alignment film RN1663 made by Nissan Chemical Industries, Ltd. is formed to have a thickness of 100 nm. Next, an n-type liquid crystal MJ961213 made by Merck Ltd. is vacuum injected, and an injection port is sealed after the end of the injection. In this way, a liquid crystal display panel is completed.

Two liquid crystal display panels are fabricated for each of the three kinds of ball spacers, and a tap test of the liquid crystal display panels is performed. As shown in FIG. 6, in the liquid crystal display panels (sample No. 1 and No. 2) using the ball spacers with the 10% K value of 3.92 mPa, the light leak is observed in both cases before and after the tap test. In the liquid crystal display panels (sample No. 3 and No. 4) using the ball spacers with the 10% K value of 4.70 mPa, the light leak is not observed before the tap test, and on the other hand, after the tap test, although the light leak is slightly observed in the sample No. 3, the light leak is not observed in the sample No. 4. In the liquid crystal display panels (sample No. 5 and No. 6) using the ball spacers with the 10% K value of 5.98 mPa, the light leak is not observed in any case before and after the tap test.

As stated above, as the K value of the ball spacer becomes small, the light leak hardly occurs when the TFT substrate and the opposite substrate are attached to each other (before the tap test), or even if a shock is given by tapping the display surface of the liquid crystal display panel (after the tap test). Accordingly, the ball spacer made of relatively soft material as compared with the vertical alignment films 14 and 22 and having a small K value has a remarkable effect to prevent the occurrence of the light leak due to the damage of the vertical alignment film. Especially, in the liquid crystal display panel using the ball spacer with the 10% K value of 4.70 mPa or less, the effect of preventing the occurrence of the light leak is high.

As described above, in the MVA mode liquid crystal display device of this embodiment, the ball spacer made of relatively soft material as compared with the vertical alignment films 14 and 22 and having a small K value is used, so that the vertical alignment films can be prevented from being damaged, and the light leak can be prevented from occurring. By this, in the MVA mode liquid crystal display device of this embodiment, the same effect as the former embodiment can be obtained.

The present invention is not limited to the above embodiments, and can be variously modified.

Although the MVA mode liquid crystal display device according to the fifth embodiment has the same pixel structure as the conventional liquid crystal display device, the same pixel structure as the liquid crystal display device of the first to fourth embodiments may be adopted. Also in this case, the same effect as the above embodiment can be obtained.

Besides, although the TFT substrate 2 of the MVA mode liquid crystal display device according to the third and fourth embodiments has the same structure as the TFT substrate 102 of the conventional liquid crystal display device, the invention is not limited to this. For example, like the TFT substrate 2 of the liquid crystal display device according to the first and second embodiments, the TFT substrate 2 may have the recessed part 26 at the position opposite to the linear protrusion 18. Also in this case, the same effect as the above embodiment can be obtained.

What is claimed is:

1. A liquid crystal display device, comprising:
a pair of substrates disposed to be opposite to each other;
a pixel electrode formed on one of said substrates;
an opposite electrode formed on the other of said substrates;
an alignment film formed on said opposite electrode;
a protrusion formed between said opposite electrode and said alignment film;
spherical spacers scattered between the pair of substrates;
a liquid crystal sealed between the pair of substrates; and
an alignment film protrusion as an alignment regulating structure formed by said alignment film in an area corresponding to said protrusion, such that said protrusion causes said alignment film protrusion to protrude toward said liquid crystal, said alignment film protrusion being formed to be recessed on a side opposite to the one of the pair of substrates and for regulating an alignment direction of the liquid crystal contacting said alignment film protrusion, said alignment film protrusion including a recessed portion, formed within an outer surface thereof, within which at least one of said spherical spacers is seated, whereby said recessed portion reduces compressive stress exerted on said substrates by said spherical spacer seated therein;

wherein said spherical spacers are scattered in an area opposite said pixel electrode, and wherein said spherical spacers are scattered in an area with no alignment film protrusions.

2. The liquid crystal display device according to claim 1, wherein the spherical spacers are made of relatively soft material as compared with the alignment film.

3. The liquid crystal display device according to claim 1, wherein the liquid crystal has a negative dielectric anisotropy.

4. The liquid crystal display device according to claim 1, wherein circular polarizing plates are respectively disposed on opposite sides of opposing surfaces of the pair of substrates.

5. The liquid crystal display device according to claim 1, wherein said recessed portion provides a reduced height portion within said alignment film protrusion.

6. The liquid crystal display device according to claim 1, wherein said protrusion and said corresponding alignment film protrusion are formed in an area opposite said pixel electrode.

* * * * *